(12) United States Patent
Sun

(10) Patent No.: US 8,689,929 B2
(45) Date of Patent: Apr. 8, 2014

(54) EXCITATION DEVICE AND METHOD FOR DOWNHOLE SEISMIC TESTING USING THE SAME

(75) Inventor: Chang-Guk Sun, Daejeon (KR)

(73) Assignee: Korea Institute of Geoscience & Mineral Resources, Dejeon (KR)

( * ) Notice: Subject to any disclaimer, the term of this patent is extended or adjusted under 35 U.S.C. 154(b) by 0 days.

(21) Appl. No.: 13/433,497

(22) Filed: Mar. 29, 2012

(65) Prior Publication Data

US 2012/0298440 A1    Nov. 29, 2012

(30) Foreign Application Priority Data

May 25, 2011  (KR) .......................... 10-2011-0049743

(51) Int. Cl.
*G01V 1/04*       (2006.01)
*G01V 1/143*      (2006.01)

(52) U.S. Cl.
USPC .......................................................... 181/121

(58) Field of Classification Search
USPC ........................................ 181/113, 114, 121
See application file for complete search history.

(56) References Cited

U.S. PATENT DOCUMENTS

| | | | | |
|---|---|---|---|---|
| 3,557,603 A | * | 1/1971 | Carr | 73/12.04 |
| 4,118,994 A | * | 10/1978 | Layotte et al. | 74/61 |
| 4,284,163 A | * | 8/1981 | Pritchett | 181/113 |
| 4,298,086 A | * | 11/1981 | Pritchett | 181/113 |
| 4,564,083 A | * | 1/1986 | Layotte et al. | 181/114 |
| 4,609,066 A | * | 9/1986 | Layotte et al. | 181/121 |
| 4,712,641 A | * | 12/1987 | Chelminski | 181/113 |
| 4,771,858 A | * | 9/1988 | Goodloe | 181/114 |
| 4,850,451 A | * | 7/1989 | Cholet et al. | 181/114 |
| 5,400,640 A | * | 3/1995 | Stuckey | 73/12.14 |
| 7,650,962 B2 | * | 1/2010 | Quinn et al. | 181/121 |

FOREIGN PATENT DOCUMENTS

| | | |
|---|---|---|
| JP | 1996201527 A | 8/1996 |
| KR | 100660562 B1 | 12/2006 |

OTHER PUBLICATIONS

Geostuff, 2010, "Geostuff Wall-Lock Borehole Geophones," archived on Oct. 21, 2010.
Chang-guk Sun, Hong-jong Kim, Jong-hong Jung, Gyungja-ja Jung, 2006, "Synthetic Application of Seismic Piezo-cone, Penetration Testing for Evaluating Shear Wave Velocity in Korean Soil," Geophysical exploration, vol. 9, No. 3, pp. 207-224, including English language abstract.

* cited by examiner

*Primary Examiner* — Jeremy Luks
(74) *Attorney, Agent, or Firm* — Caesar, Rivise, Bernstein, Cohen & Pokotilow, Ltd.

(57) ABSTRACT

An excitation device for downhole seismic testing, includes an excitation hammer, a holding arm connected at one end thereof to the excitation hammer to allow the excitation hammer to rotate about the other end thereof, a support post having the other end of the holding arm rotatably coupled to an upper end thereof to support the excitation hammer and the holding arm at a certain height, and an excitation source configured to allow the support post to stand upright on the upper side thereof and which generates a seismic wave when struck by the rotated excitation hammer. The support post is formed at a lower end thereof with a securing section detachably inserted into a groove for the support post formed on the upper side of the excitation source such that the support post, the holding arm, the excitation hammer and the excitation source can be separated from each other.

8 Claims, 4 Drawing Sheets

PRIOR ART

EXCITATION DEVICE AND METHOD FOR DOWNHOLE SEISMIC TESTING USING THE SAME

BACKGROUND OF THE INVENTION

1. Field of the Invention

The present invention relates to an excitation device and method for downhole seismic testing using the same, and more particularly, to an excitation device for downhole seismic testing, which is installed on the ground to generate seismic waves with efficiency and accuracy and allows separation into individual units for convenient carriage and secure installation, and a method for downhole seismic testing using the same.

2. Description of the Related Art

For efficient management of water that is essential for human life and industrial development, structures, such as dams, reservoirs, seawalls, banks, and the like, can be built not only with reinforced concrete, but also in the form of an embankment structure through construction of earth materials such as soil, sand, rock, and the like.

The crest of the embankment structure constructed of the earth materials is generally paved with asphalt, concrete or other special material having flexibility, or is protected by blocks having various shapes and sizes not only for the purpose of construction of a road or sightseeing, but also for the protection of an embanked body from various factors, such as erosion, weathering, water of infiltration, and the like. Since the embankment structure for water conservation or management is very closely related to variation of the underground water level in view of stability and functions thereof, observation holes for observing the underground water level are formed at major points on the crest of the embankment structure to allow periodic observation of variation in the underground water level.

Large scale and deep excavation works are frequently performed in cities for foundation works for large buildings or structures or for works for construction of underground spaces, and various kinds of measurement are periodically performed with respect to the surrounding ground during excavation works to determine stability of neighboring buildings. In this case, various observation holes for observing the underground water level are formed corresponding to places on the ground near an excavation site, the majority of which has been already paved. Since the effect of excavation work on the surrounding ground can be determined at various points through periodic measurement of the variation of the underground water level, the measurement of the variation of the underground water level is considered a crucial factor.

Generally, excavation work or the embankment structure for water conservation or management is planned or designed in consideration of the aim or performance guarantee term in view of geotechnical engineering or hydraulics. Even in this case, however, stability of a target structure or the surrounding ground and structures can change during construction of the structure or over time due to abnormal variation of material or design factors, unpredicted inner or outer factors, and the like.

From this point of view, it is necessary to perform periodic and continuous measurement of the embankment structure or the conditions of the surrounding ground near an excavation site. Particularly, in the embankment structure for water conservation or management or the ground near an excavation site in which the underground water level is higher than an excavation base, there can be a gradual or rapid variation in engineering characteristics of the ground, which acts as an inner construction material, due to variation of the underground water level or secondarily induced factors. Change in characteristics of the ground material is directly related to local or overall stability of a structure. Particularly, dynamic stiffness at a small strain level, that is, body wave velocity as a characteristic of quantitative seismic waves is considered one of the most important material characteristics in the related art.

Since behavior with respect to effective stress corresponding to behavior of pore fluid is very important for ground materials, shear wave velocity ($V_S$) is considered a major factor in the body wave velocity composed of compressional wave velocity ($V_P$) and shear wave velocity ($V_S$). From this point of view, evaluation of target ground materials must be systemized based on a useful ground engineering technique through periodic and continuous measurement of the shear wave velocity.

Nevertheless, periodic and continuous measurement and evaluation of the shear wave velocity for most ground materials which require stability has never been taken into consideration. Further, in evaluation of overall stability with respect to a target structure, non-periodic seismic testing under limited conditions, such as non-destructive seismic testing on the ground surface, is generally used to confirm distribution of the shear wave velocity in a material.

Generally, among the techniques for determining distribution of a shear wave velocity according to an increase in depth, a borehole seismic test method is performed through construction of boreholes and has higher reliability than a surface wave test method which is performed on the ground surface. In particular, downhole seismic testing as illustrated in FIG. 1 has higher economic feasibility and efficiency than crosshole seismic testing and is thus actively applied to ground engineering.

Referring to FIG. 1, for downhole seismic testing, with a hexahedral excitation source 10 such as a log placed on the ground surface, a borehole 40 is formed vertically from the ground surface according to an increase in excavation depth and at least one receiver 50 for detecting excavation is prepared. The downhole seismic test is performed in-situ by obtaining a seismic wave signal generated on the ground surface while changing the location of the receiver 50 according to variation in excavation depth. Here, when confirming excitation from an initial motion detector 20 connected to the excitation source 10, a dynamic signal detector 30 placed on the ground obtains the seismic wave signal from the receiver 50 inside the borehole 40.

Seismic wave signals according to depth as obtained in-situ are analyzed through several steps to determine distribution of the shear wave velocity according to excavation depth (Chang-guk Sun, Hong Jong Kim, Jong-hong Jung, Gyung-ja Jung, 2006, "Synthetic Application of Seismic Piezo-cone Penetration Testing for Evaluating Shear Wave Velocity in Korean Soil", Geophysical exploration, Volume 9, No. 3, pp. 207-224). Then, variation in conditions and stability of a target structure can be evaluated based on quantitative variation according to temporal and spatial differences of the shear wave velocity.

SUMMARY OF THE INVENTION

The present invention is directed to providing an excitation device for downhole seismic testing, and a method for downhole seismic testing using the same, which can be conveniently disassembled and assembled to allow convenient carriage.

The present invention is also directed to providing an excitation device for downhole seismic testing and a method for downhole seismic testing using the same, which can be secured to target ground for periodic and continuous evaluation of conditions of the target ground while allowing the target ground to perform normal functions. Here, the excitation device is configured to secure an absolute location of an excitation source at a certain location on the ground by providing a reference socket within the target ground.

The present invention is also directed to providing an excitation device for downhole seismic testing and a method for downhole seismic testing using the same, which may maximize expressed energy while securing orientation of seismic waves upon generation of the seismic waves. Here, the present invention is directed to providing test data for multiple purposes through diversification of the intensity of the expressed energy.

The present invention is also directed to providing an excitation device for downhole seismic testing and a method for downhole seismic testing using the same, which employs an existing observation hole for observing an underground water level, instead of constructing a separate test hole which requires an operation for abandoning the hole, and permits combinational analysis of quantitative distribution variation of shear wave velocity and compressional wave velocity corresponding to variation of an underground water level at the same spatial location, thereby significantly improving reliability of stability testing of target ground.

In accordance with one aspect, an excitation device includes an excitation hammer; a holding arm connected at one end thereof to the excitation hammer to allow the excitation hammer to rotate about the other end thereof; a support post having the other end of the holding arm rotatably coupled to an upper end thereof to support the excitation hammer and the holding arm at a certain height; and an excitation source which is configured to allow the support post to stand upright on the upper side thereof and generates a seismic wave when struck by the rotated excitation hammer. Here, the support post is formed at a lower end thereof with a securing section detachably inserted into a groove for the support post formed on the upper side of the excitation source such that the support post, the holding arm, the excitation hammer and the excitation source can be separated from each other.

The excitation source may be formed at a lower side thereof with an indentation frame into which a transfer wedge is removably inserted, and the transfer wedge may include a head inserted into the indentation frame and a tip directly inserted into target ground or into a wedge reference socket in the target ground.

The support post may have an "L" shape to secure a rotation space for allowing the excitation hammer to strike a side surface of the excitation source.

The excitation source may be made of wood.

The indentation frame and the transfer wedge may be made of an iron-based material.

The excitation source may have a parallelepiped shape having a width of 30 to 50 cm, a height of 20 to 40 cm, and a length of 50 to 80 cm.

The groove for the support post may have a depth of one third the height of the excitation source.

The indentation frame may be formed at a place a quarter of the length of the excitation source from a distal end of the excitation source and have a depth of one third the height of the excitation source.

In accordance with another aspect, a seismic test method includes: removing an upper soil and a protective layer from target ground to secure an installation space; placing the excitation device having any one of the aforementioned features inside the installation space; placing a detection receiver in an observation hole for observing an underground water level, and obtaining a seismic wave signal generated from the excitation device to perform downhole seismic testing; and removing the excitation device and inserting a cover block into the installation space, after finishing the test.

The protective layer may include a ground pavement material.

The installation space may be formed orthogonal to the observation hole.

A boundary block made of a stretchable material may be disposed on a vertical plane of the installation space.

The cover block may include a gripper on an upper surface thereof.

The target ground in the installation space may be formed with a wedge reference socket.

The wedge reference socket may be made of wood.

BRIEF DESCRIPTION OF THE DRAWINGS

The above and other aspects, features and advantages of the invention will become apparent with reference to the following exemplary embodiments in conjunction with the accompanying drawings, in which.

DETAILED DESCRIPTION OF THE EXEMPLARY EMBODIMENTS

Exemplary embodiments of the present invention will now be described in detail with reference to the accompanying drawings.

For most embankment structures, a surface layer of the crest is subjected to pavement for preventing constituent materials from suffering erosion or weathering, or to block construction for protection or performance guarantee. For the ground around an excavation site, the surface layer is also subjected to pavement or other processes using pavement blocks. For such reasons, target ground has a sub-base, a base, and surface layers, such as ascon pavement, flexible pavement, pavement blocks, and the like, formed thereon. To provide continuous stability evaluation with respect to target facilities and surround ground including ground materials, which are covered with additional materials including pavement or processing blocks, an observation hole for observing an underground water level is formed to a predetermined depth from the ground surface at an essential place in terms of engineering feasibility to enable periodic measurement of the underground water level.

In the present invention, an excitation device for downhole seismic testing according to one exemplary embodiment of the invention is provided to target ground through upper layers (surface layer, base, and sub-base), which are formed on the ground material for protection of the ground material or other purposes.

Figure 1:
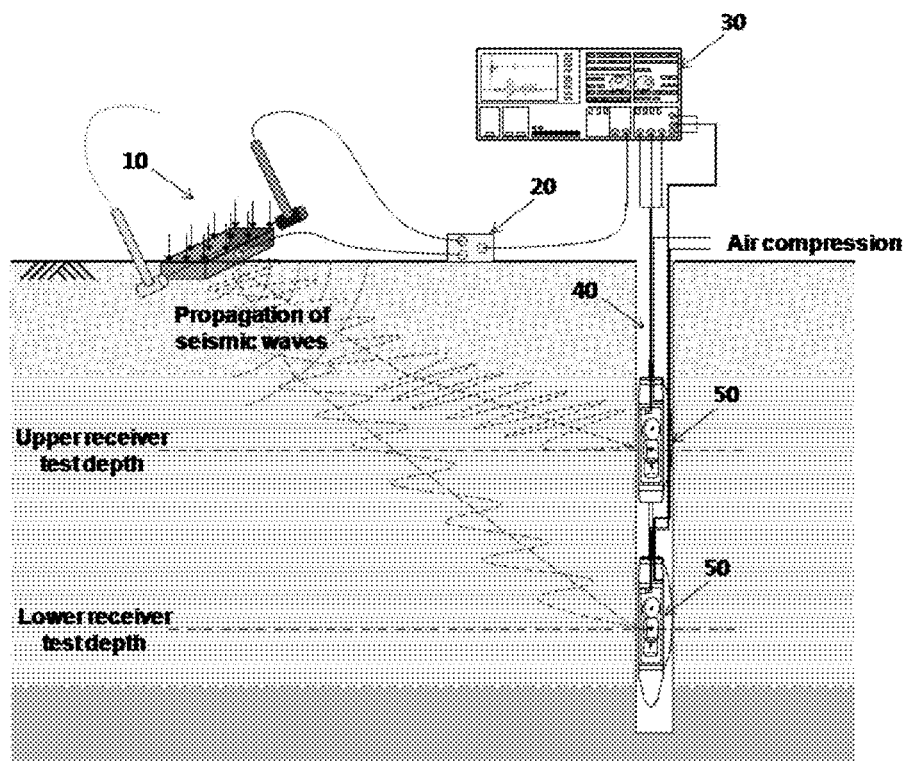
FIG. 1 is a schematic illustration of a conventional downhole seismic test method.
Figure 2:
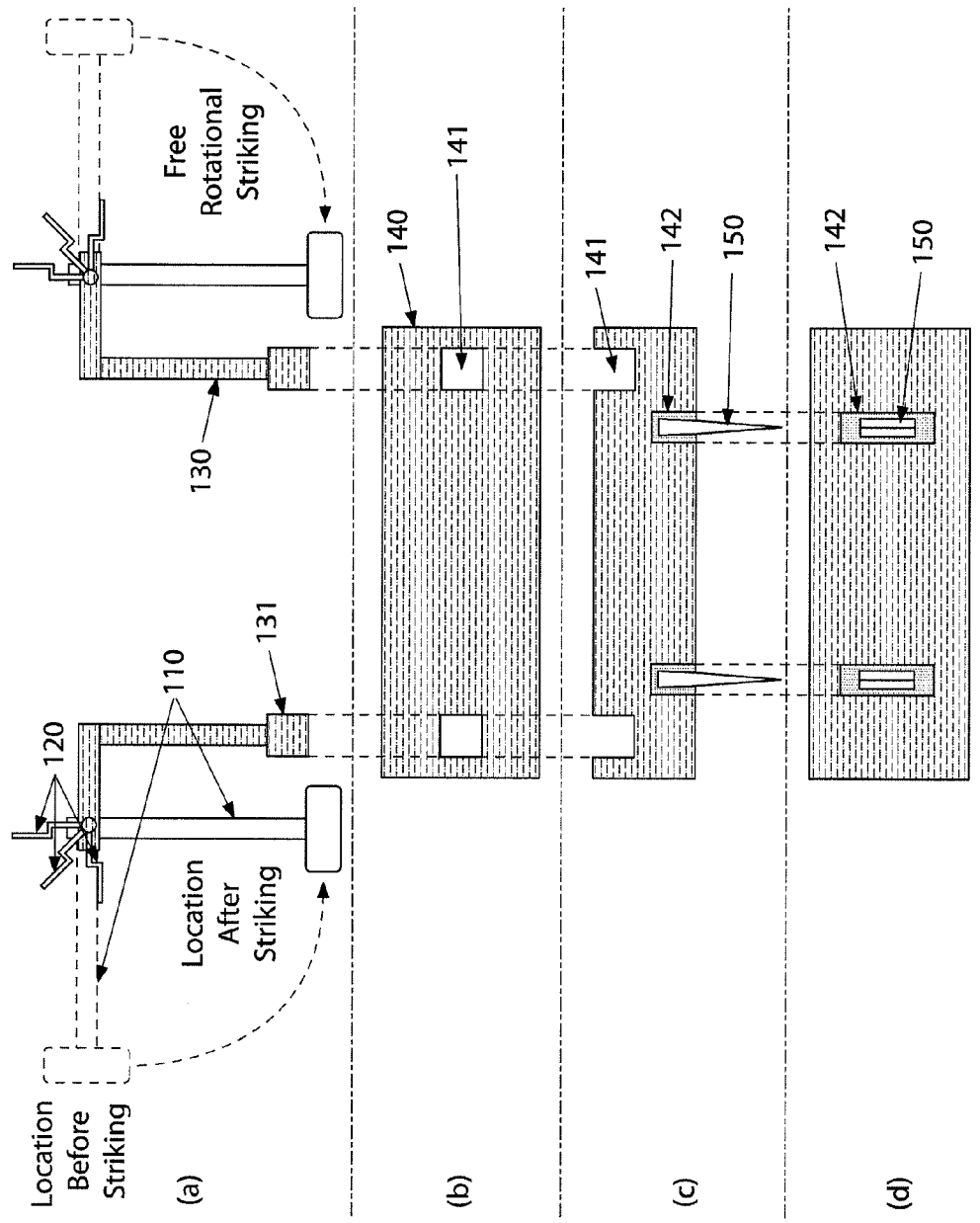
FIG. 2 is a schematic illustration of an excitation device according to one exemplary embodiment of the present invention.

FIG. 2 is a view of an excitation device according to one exemplary embodiment of the present invention.

Referring to FIG. 2, the excitation device according to the embodiment includes an excitation hammer 110, a holding arm 120 which provides rotational force to the excitation hammer 110, a support post 130 which supports the excitation hammer 110 and the holding arm 120 at a predetermined height, an excitation source 140 which generates a seismic wave when struck by the excitation hammer 110, and a transfer wedge 150 inserted at one side thereof into the excitation source 140 and at the other side into the ground to transfer the seismic wave into the ground.

In FIG. 2, (a) is a side view illustrating constitution and operation of the excitation hammer 110, the holding arm 120 and the support post 130, (b) is a plan view of the excitation source 140, (c) is a side-sectional view illustrating the excitation source 140 and the transfer wedge 150, and (d) is a bottom view of the excitation source 140 and the transfer wedge 150.

Referring to FIG. 2(a), the support post 130 is provided at a lower end thereof with a securing section 131, which may be inserted into and secured to a groove for the support post 141 of the excitation source 140, and has an upper end to which one side of the holding arm 120 is secured.

The support post 130 serves to maintain the holding arm 120 and the excitation hammer 110 connected to the holding arm 120 at a predetermined height while securing a space for rotation of the excitation hammer 110. Specifically, as shown in FIG. 2(a), the support post 130 may generally have an "L" shape. The support post is secured at the upper end thereof to one side of the holding arm 120 and is formed at the lower end thereof with the securing section 131, which may be inserted into and secured to the groove for the support post 141 of the excitation source 140. The securing section 131 may be easily inserted into or removed from the groove for the support post 141, so that the excitation source 140 and the support post 130 can be easily separated from each other, thereby allowing convenient carriage of the support post 130, the holding arm 120 and the excitation hammer 110.

As described above, the holding arm 120 is secured at one end thereof to the upper end of the support post 130 and is connected at the other end thereof to the excitation hammer 110. Here, the other end of the holding arm acts as a free end. Thus, the one side of the holding arm 120 coupled to the support post 130 acts as a rotational axis and the other side of the holding arm 120 freely rotates about the rotational axis.

The one side of the holding arm 120 may have a hinge structure to act as a rotational axis, and be optionally provided with a separate goniometer which can measure the rotational angle of the holding arm 120, that is, the rotational angle of the excitation hammer 110. The rotational angle of the holding arm 120 may be in the range of 1 to 180 degrees.

The excitation hammer 110 is secured at one side thereof to the free end of the holding arm 120 such that the other side of the excitation hammer 110, that is, the head of the excitation hammer, can be rotated by rotation of the holding arm 120.

The excitation hammer 110, the holding arm 120 and the support post 130 may be constituted as a pair of excitation hammers, a pair of holding arms, and a pair of support posts, respectively.

Next, referring to FIGS. 2(a), (b) and (c), the excitation source 140 according to this embodiment generally has a parallelepiped shape. Advantageously, the excitation source 140 may have a width of 30 to 50 cm, a height of 20 to 40 cm, and a length of 50 to 80 cm in terms of test performance, convenient carriage, and manufacturing efficiency.

In some embodiments, the excitation source 140 may be made of a log.

Referring to FIGS. 2(a) and 2(b), the excitation source 140 is formed at either side thereof with the groove for the support post 141, into which the securing section 131 of the support post 130 can be securely inserted. In some embodiments, the groove for the support post 141 may have a depth of one third the height of the excitation source 140.

The grooves for the support post 141, which are formed at opposite sides of the excitation source 140 in the longitudinal direction of the excitation source, are normally filled with the same wood material as that of the support post 141, and the excitation hammer 110, the holding arm 120 and the support post 130 are kept separate.

In downhole seismic testing, both side surfaces of the excitation source 140 are struck in a lateral direction, or the upper surface of the excitation source 140 is struck in a vertical direction to generate seismic waves, which mainly consist of a shear wave or a primary wave. When the support post 130 is not installed, it is possible to obtain excitation through artificial striking only with the excitation hammer 110 in the lateral direction and exhibition of the shear wave caused thereby.

Generally, artificial striking may cause differences in magnitude of excitation energy upon each strike, which limits quantitative comparison analysis based on differences in amplitude of the seismic waves according to location. Thus, in order to overcome such a limit, the support post 130 is connected at the upper end thereof to the excitation hammer 110, and the holding arm 120, which permits initial positioning before striking operation of the excitation hammer 110, is provided to an upper portion of the support post 130 connected to the excitation hammer 110 to guarantee that the excitation hammer strikes the excitation source with the same energy each time. In some embodiments, a multi-stage holding arm, which can be set at various angles, may be used in consideration of diversification of excitation energy.

Further, referring to FIGS. 2(b) and (c), the excitation source 140 is provided at opposite lower sides with indentation frames 142, into which the transfer wedges 150 can be removably inserted. In some embodiments, each of the indentation frames 142 is formed at a place a quarter the length of the excitation source 140 from a distal end of the excitation source and has a depth of one third the height of the excitation source 140.

The indentation frames 142 are provided to the lower side of the excitation source 140 made of wood, and may be made of an iron-based material. The indentation frames 142 serve to receive the transfer wedges 150, each of which has a large chisel shape. In some embodiments, the transfer wedges 150 may also be made of an iron-based material.

More specifically, a thick head of each transfer wedge 150 is inserted into the corresponding indentation frame 142 in the excitation source 140, and a sharp tip of the transfer wedge 150 is directly inserted into target ground or into a receiving section formed in the target ground. Since the transfer wedges 150, which are placed inside the excitation source 140 and extend to the target ground, are key to any deformation behavior with respect to the target ground upon excitation during downhole seismic testing, the transfer wedges 150 serve not only to secure orientation of the seismic waves, but also to maximize expressed energy.

Herein, for periodic downhole seismic test and continuous evaluation regarding conditions of excavated ground and a structure for water conservation or management, which has a crest acting as a general road and is constructed on target ground having upper protective layers (surface layer, base, sub-base), a cover block 200, which permits efficient positioning of the excitation device and serves as a normal road in normal times, and a method for application thereof are disclosed.

Figure 3:
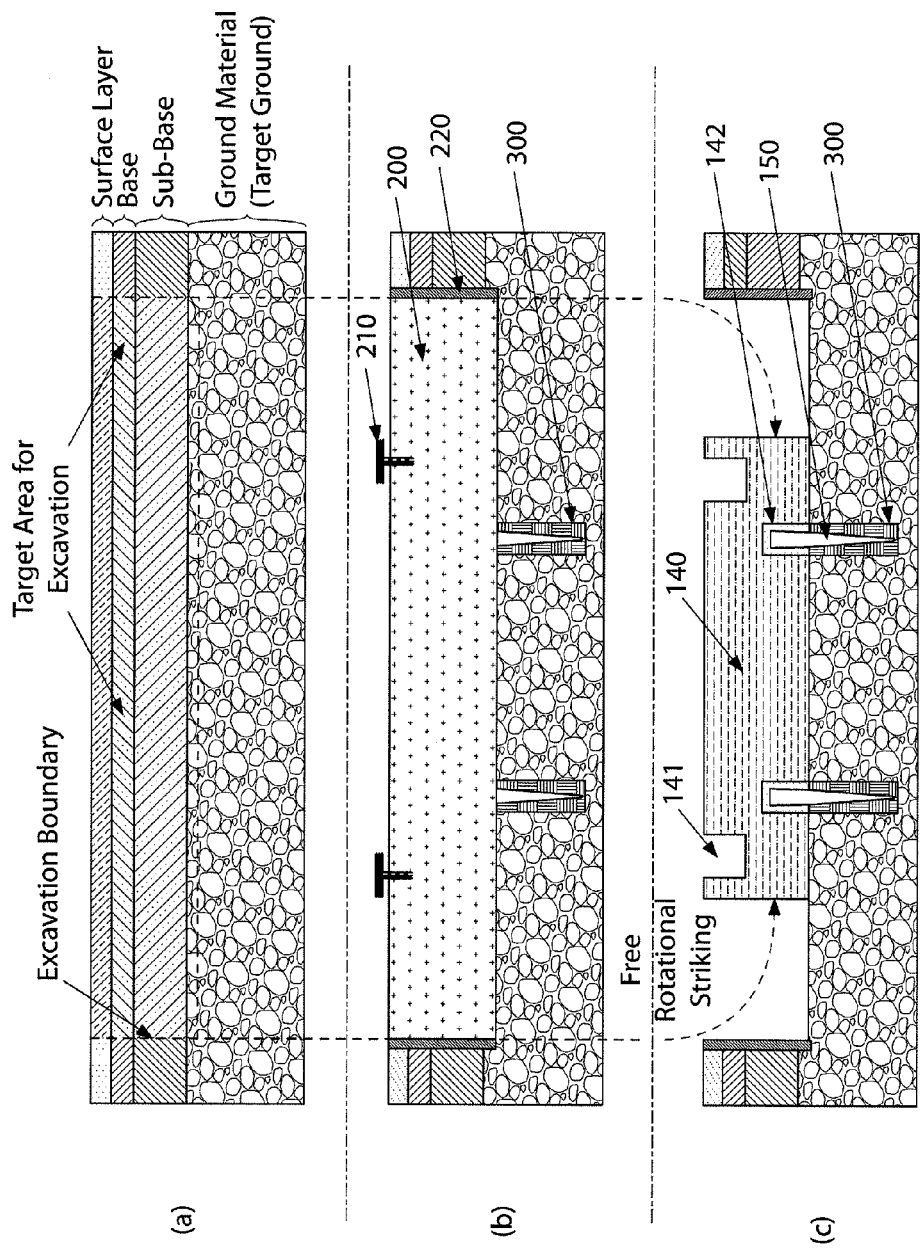
FIG. 3 is a schematic illustration of a cover block of the excitation device according to the exemplary embodiment of the present invention.

FIG. 3 illustrates a cover block of the excitation device according to the exemplary embodiment of the present invention.

Specifically, FIG. 3(a) is a side sectional view illustrating an initial structure of a ground surface paving material and an excavation target area for installation of the excitation device, FIG. 3(b) is a side sectional view illustrating a cover block 200 applied to the excavation target area, and FIG. 3(c) is a side sectional view of the excitation device after opening the cover block 200.

In FIG. 3(a), parts of protective layers (surface layer, base, sub-base) and target ground are excavated to provide a space for installation or removal of the excitation device.

First, the space for installation or removal of the excitation device and geometric features of the cover block 200 will be described. For application of the cover block 200, the space is defined to sufficiently enclose the excitation device for downhole seismic testing. In particular, the space may have a sufficient length in the longitudinal direction so as not to obstruct free rotational striking of the excitation hammer 110 during downhole seismic testing and has a width about 10 cm greater from both boundaries than the width of the excitation source.

Further, excavation is performed to a depth to remove the upper layers of the target ground and a very minute upper portion of the target ground. Further, as shown in FIG. 3(b), the cover block 200 is made of a lightweight material in order to permit efficient attachment and removal thereof and is provided on an upper surface thereof with a gripper 210, which is normally depressed coplanar with the upper surface of the cover block and is then pulled above the upper surface upon elevation of the cover block.

After excavation, boundary blocks 220 made of a stretchable material such as rubber are provided to four vertical planes of the space and serve as stretchable linkages between the cover block 200 and the upper construction layers on the target ground. Further, as shown in FIGS. 3(b) and (c), wedge reference sockets 300 are formed in the target ground corresponding to the shape and position of the transfer wedges 150 which are used together with the excitation source 140. In some embodiments, the wedge reference sockets 300 may be made of wood when taking into consideration rigidity, flexibility, and plasticity of iron and soil. By inserting such wooden wedge reference sockets 300 into the target ground, it is possible to guarantee that the excitation source is positioned at the same place each time downhole seismic testing is performed.

In some embodiments, a space to be equipped with the cover block 200 is formed by excavating the protective layers (surface layer, base and sub-base) and the target ground (see FIG. 3(a)). Then, with the wedge reference sockets 300 secured under the space, the cover block 200 covers the space to allow the excavated part of the target ground to be used in normal times (see FIG. 3(a)). Then, during testing, the cover block 200 is removed therefrom to place the excitation device on the target ground for downhole seismic testing.

Next, a method for downhole seismic testing according to one exemplary embodiment of the invention using an existing observation hole for observing an underground water level will be described with reference to FIG. 4.

Figure 4:
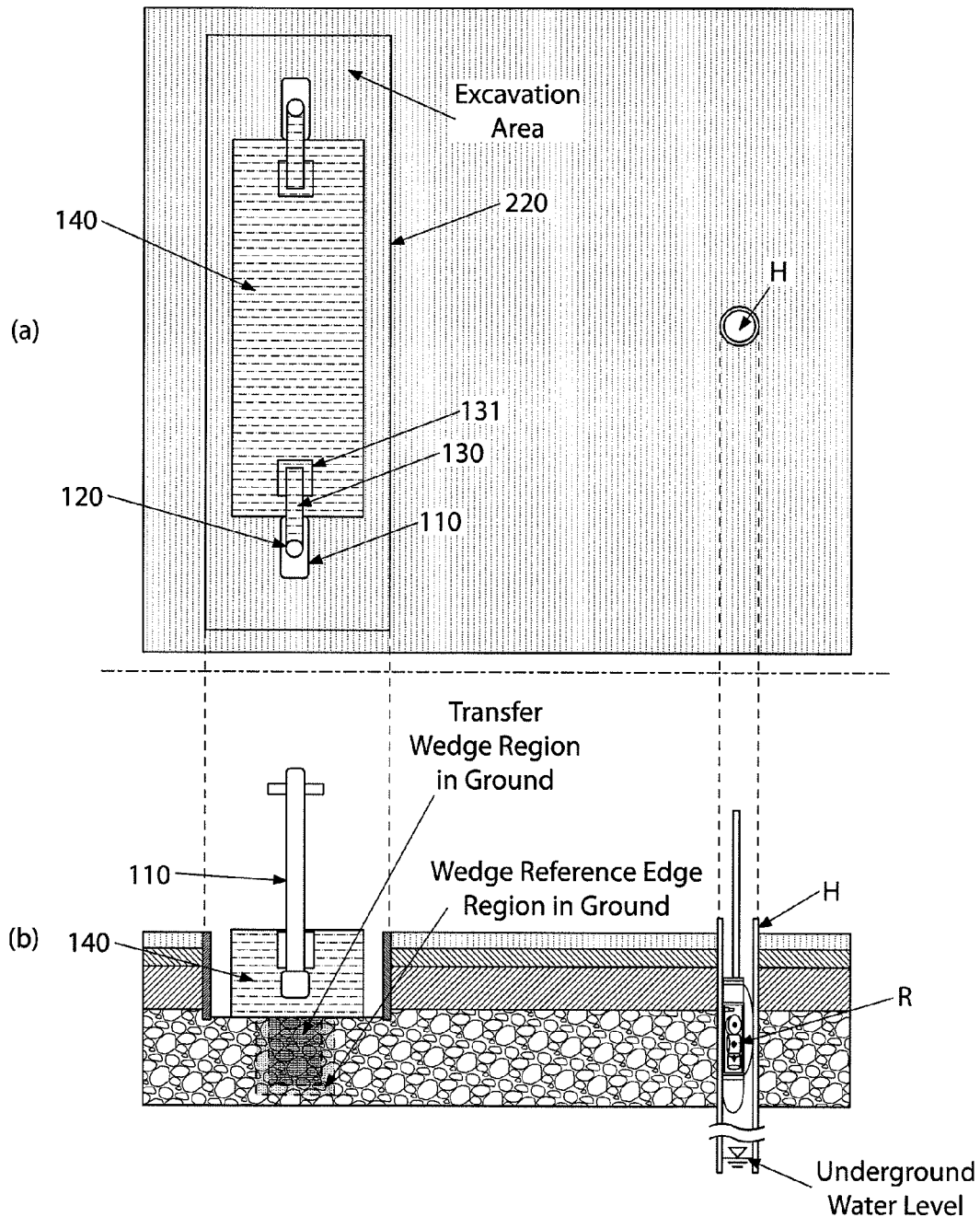
FIG. 4 is a schematic illustration of a downhole seismic test method according to one exemplary embodiment of the present invention.

FIG. 4 illustrates a downhole seismic test method according to one exemplary embodiment of the present invention In FIG. 4, an observation hole H for observing an underground water level to be equipped with an excitation device for downhole seismic test and a test receiver R is shown.

In FIG. 4, (a) is a top view of the excitation device and the observation hole H, illustrating conditions for downhole seismic testing, and (b) is a side sectional view of the excitation device and the observation hole H, illustrating the conditions for downhole seismic testing.

The observation hole H generally has an inner diameter of about 50 mm, which is smaller than a conventional test hole used for downhole seismic testing and having an inner diameter of about 60 to 70 mm. Thus, to use the observation hole H as the test hole for downhole seismic testing, a small detection receiver R having a diameter of about 45 mm is used instead of a general receiver R having a diameter of about 60 mm. Such a small detection receiver R may be conveniently manufactured through application of three commercially available speedometers in three directions. Alternatively, any small, commercially available receiver (for example, Geostuff, 2010, Geostuff Wall-Lock Borehole Geophones, http://www.geostuff.com/geophone.htm, Accessed 11 Nov. 2010.) may also be used.

In addition, the cover block 200 replacing the ground surface pavement for installation of the excitation source for downhole seismic testing is positioned orthogonal to the observation hole H for observing an underground water level (that is, such that the excavated installation space becomes orthogonal to the observation hole) while being separated about 2 m to 3 m therefrom, thereby eliminating a need for a test hole for downhole seismic testing through additional excavation while guaranteeing multipurpose use of the observation hole H. Furthermore, since the observation hole H is used for observation of the underground water level in normal times, there is no need to abandon the observation hole after seismic testing. In addition, combinational analysis of quantitative distribution variation of shear wave velocity and compressional wave velocity may be performed corresponding to variation of the underground water level at the same location, thereby significantly improving reliability of stability testing for the target ground.

According to the exemplary embodiments of the invention, the excitation device may be conveniently disassembled and assembled, thereby enabling convenient carriage thereof.

In addition, the excitation device may be secured to target ground to perform periodic and continuous evaluation of conditions of the target ground while allowing the target ground to perform normal functions. In particular, the excitation device may secure an absolute location of an excitation source on the ground by providing a reference groove within the target ground, thereby improving reliability of test data.

Further, the excitation device may maximize expressed energy while securing orientation of seismic waves and may provide test data for multiple purposes through diversification of the intensity of the expressed energy.

Further, the excitation device employs an existing observation hole for observing an underground water level, instead of forming a separate test hole which requires an operation for abandoning the hole, and permits combinational analysis of quantitative distribution variation of shear wave velocity and compressional wave velocity corresponding to variation of an underground water level at the same location, thereby significantly improving reliability of stability testing with respect to target ground.

Some exemplary embodiments have been disclosed in the specification and drawings. It should be understood that the terms used in these embodiments are provided for the purpose of illustration and are not intended to limit the scope of the invention set forth in the accompanying claims. Therefore, it will be apparent to those skilled in the art that various modifications, changes, alterations, and equivalent embodiments can be made without departing from the spirit and scope of the invention. The scope of the invention should be limited only by the accompanying claims and equivalents thereof.

What is claimed is:

1. A system for downhole seismic testing, comprising:
   a. an excitation device comprising:
      an excitation hammer;
      a holding arm connected at one end thereof to the excitation hammer to allow the excitation hammer to rotate about the other end thereof;
      a support post having the other end of the holding arm rotatably coupled to an upper end thereof to support the excitation hammer and the holding arm at a certain height, the support post being formed at a lower end thereof with a securing section detachably inserted into a groove for the support post formed on an upper side of an excitation source such that the support post, the holding arm, the excitation hammer and the excitation source can be separated from each other; and
      an excitation source which is configured to allow the support post to stand upright on the upper side thereof and generates a seismic wave when struck by the rotated excitation hammer; and
   b. a boundary block made of a stretchable material, wherein the boundary block is disposed on a vertical plane of an installation space excavated to install the excitation device.

2. The excitation device of claim 1, wherein the excitation source is formed at a lower side thereof with an indentation frame into which a transfer wedge is removably inserted, and the transfer wedge comprises a head inserted into the indentation frame and a tip directly inserted into a target ground or into a wedge reference socket in the target ground.

3. The excitation device of claim 1, wherein the support post has an "L" shape to secure a rotation space for allowing the excitation hammer to strike a side surface of the excitation source.

4. The excitation device of claim 1, wherein the excitation source is made of wood.

5. The excitation device of claim 2, wherein the indentation frame and the transfer wedge are made of an iron-based material.

6. The excitation device of claim 1, wherein the excitation source has a parallelepiped shape having a width of 30 to 50 cm, a height of 20 to 40 cm, and a length of 50 to 80 cm.

7. The excitation device of claim 1, wherein the groove for the support post has a depth of one third the height of the excitation source.

8. The excitation device of claim 2, wherein the indentation frame is formed at a place a quarter of the length of the excitation source from a distal end of the excitation source and has a depth of one third the height of the excitation source.

* * * * *